F. A. KNOCHE.
BARREL SKID AND DRAIN PAN.
APPLICATION FILED APR. 4, 1907.
1,002,704.
Patented Sept. 5, 1911.
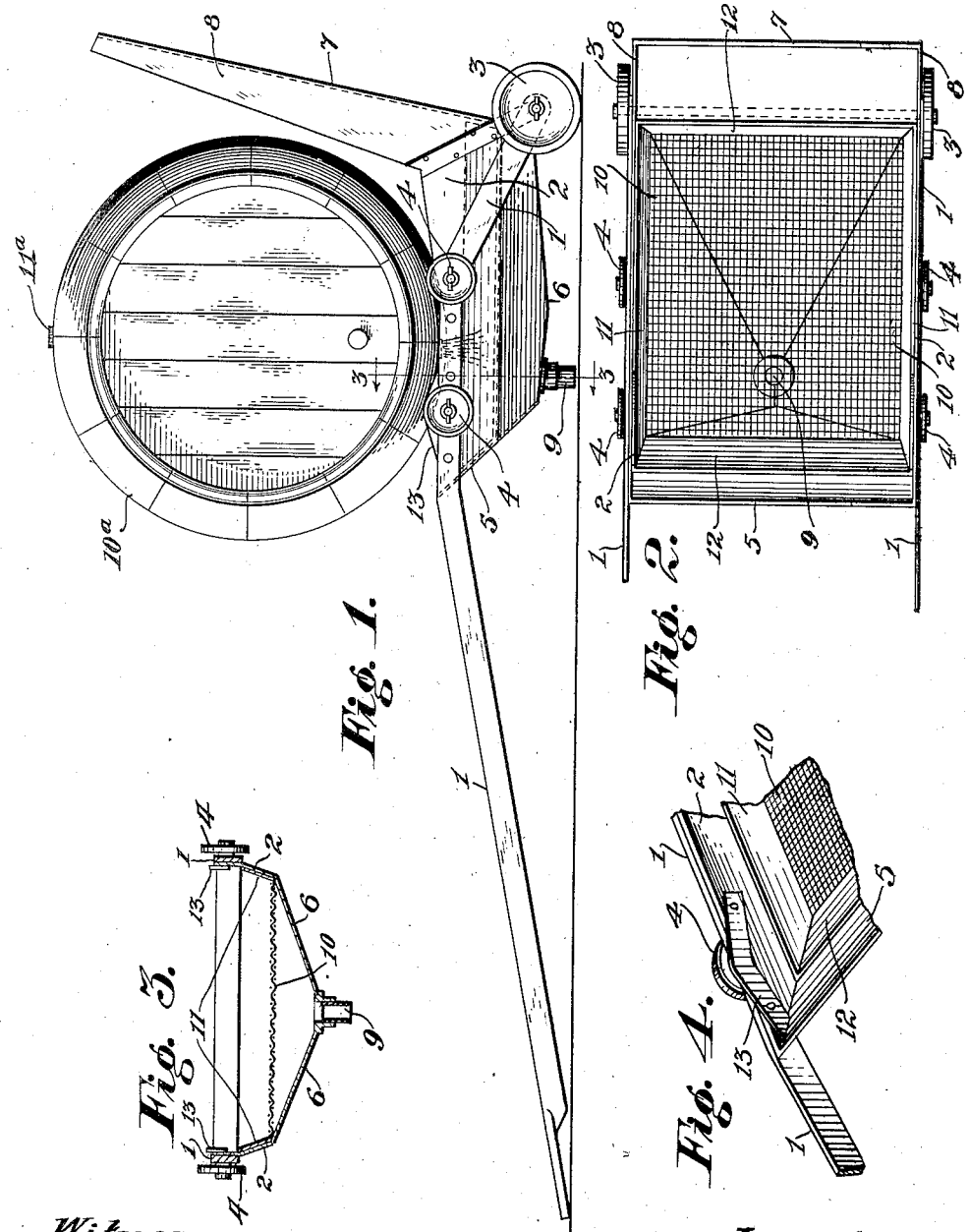

UNITED STATES PATENT OFFICE.

FRED A. KNOCHE, OF FORT WAYNE, INDIANA.

BARREL-SKID AND DRAIN-PAN.

1,002,704.  Specification of Letters Patent.  Patented Sept. 5, 1911.

Application filed April 4, 1907. Serial No. 366,273.

*To all whom it may concern:*

Be it known that I, FRED A. KNOCHE, a citizen of the United States, residing at Fort Wayne, in the county of Allen and State of Indiana, have invented certain new and useful Improvements in Barrel-Skids and Drain-Pans, of which the following is a full, clear, and exact specification.

My invention relates to improvements in barrel trucks or skids, and has for its primary object to provide an improved truck or skid by means of which a barrel or other receptacle may be transported and conveniently held and handled while the contents thereof is emptied therefrom.

To the attainment of these ends and the accomplishment of other new and useful objects as will appear, the invention consists in the features of novelty in the construction, combination and arrangement of the several parts, hereinafter more fully described and claimed and shown in the accompanying drawings, illustrating an exemplification of this invention and in which:—

Figure 1 is a view in elevation showing skid or truck with barrel in position for emptying contents; Fig. 2 is a top or plan view; Fig. 3 is a sectional view on the line 3—3 of Fig. 1; Fig. 4 is a portion of one corner of the pan showing anti-friction roller and adjacent parts.

The members 1 form the handles and chief supporting members of my skid and are joined to the side members 2 of drain pan, as shown in Fig. 1, extending thence downwardly and forming a means of support for the carrying wheels 3. The rollers 4 mounted on members 1 furnish anti-friction means for supporting a barrel or cask. The side members 2 of drain pan are joined by suitable end and bottom members as 5 and 6. I provide one end of the pan, preferably the end immediately over the carrying wheels with an upwardly extending member 7 joined to the bottom of the pan and having side members 8 joined to the side members 2 of the pan. The bottom of drain pan is provided with outlet 9 which is preferably placed at the lowest point in the pan bottom to facilitate the flow of liquids therefrom. As a means of straining liquids to be handled by my device, a screen 10 may be inserted in the pan and I preferably mount the same on a frame having side and end members 11 and 12 which permits the easy removal of the screen for the purpose of cleaning.

In the operation of my device, I utilize the handles 1 as an incline up which a barrel may be rolled into position on anti-friction rollers 4 as shown by 10ª in Fig. 1. A short incline like that shown by the member 13 may be employed to assist the operator in getting the barrel over the first pair of the anti-friction rollers. With the barrel in position the skid may be transported at the will of the operator. During transportation it will be seen that the upright section of the pan may be utilized to prevent the barrel rolling forward and off the skid or truck. In discharging the contents from a barrel the skid or truck is rolled into position with the vent pipe 9 over receiving tank or receptacle. The barrel is rotated until the bung is on top as shown by 11ª Fig. 1. The bung is then removed and the barrel rotated in the direction of the upright section of the pan until the bung hole reaches the under side. During rotation the upright section of the pan catches the discharge and directed to the main body of the receptacle.

In order that the invention might be fully understood the details of an embodiment thereof have been thus specifically described, but

What I claim is:—

1. In a skid or truck, the combination of a frame, wheels connected to said frame and supporting the same, a drain-pan connected with said frame embodying a horizontal basin and an upwardly extending member discharging into said horizontal basin, a downwardly discharging outlet in said drain-pan, and means mounted on said frame to receive a barrel or cask and permit the rotation thereof on its longitudinal axis, adapted to retain the said barrel or cask during the rotation thereof in an approximately fixed relation with respect to the said frame and drain-pan.

2. In a skid or truck, the combination of a frame, a drain-pan connected with said frame, embodying a horizontal basin and an upwardly extending member discharging into said basin, a downwardly discharging outlet in said drain-pan, and a screen disposed over said drain-pan.

3. In a skid or truck, the combination of a frame, carrying wheels, handles designed to form an incline from floor to upper side of frame, a drain-pan carried by the frame, anti-friction rollers mounted upon the upper side of said frame and adapted to retain a barrel or cask in position above the drain pan, and means extending upwardly from said drain-pan to conduct thereto the discharge from a barrel or cask during its rotation on the said anti-friction rollers.

4. In a skid or truck, the combination of a frame, being provided with handles and carrying wheels, the said handles being at one end of the frame and the carrying wheels adjacent the opposite end thereof, a drain pan connected to said frame, barrel supporting means on the upper side of the frame, a downwardly discharging outlet in the bottom of the drainpan, and a screen interposed horizontally in said drain pan between the barrel supporting means and the downwardly discharging outlet.

5. In a skid or truck, the combination with a frame, wheels connected to the frame and supporting the same, a drain pan connected to said frame, a support for a barrel or cask above the drain pan, a catch pan extending in an upward direction and discharging into the drain pan, and means in the bottom of the said basin for discharging the contents of the basin.

6. In a skid or truck, the combination with a frame, of anti-friction rollers carried on the upper side thereof for rotatably supporting a barrel or cask, a drain pan connected to said frame embodying a horizontal basin lying below the said anti-friction rollers, and a chute extending upwardly from the drain pan to a point above the anti-friction rollers and discharging into the horizontal basin, said chute being adapted to serve as a catch pan for the discharge of the contents of a barrel or cask carried on the frame during the rotation thereof, said basin being provided with a downwardly discharging outlet.

7. In a skid or truck, the combination of carrying wheels, a frame mounted thereon embodying side members forming when the truck is in position on the floor inclines leading from the floor to the upper side of the truck body and extending thence downwardly to the carrying wheels, and a drain pan carried by the side members, being secured thereto and forming cross connecting members for the frame, an upwardly extending catch pan discharging into the drain pan, anti-friction means mounted on said frame and being adapted to retain a barrel or cask in rotative position over the drain pan, and a screen covering the drain pan.

8. In a skid or truck in combination, a pair of side members having one end thereof fashioned to provide handles and being secured near their opposite extremities to the sides of a drain pan, the handle portion of the said side members being deflected at an angle to the portions attached to the drain pan to provide inclines for rolling barrels or casks into position on the skid, a support for barrels or casks secured to the skid above the drain pan, a catch pan extending upwardly and discharging into the drain pan, there being a discharge orifice in the bottom of the drain pan, and a screen in the drain pan above the said discharge orifice.

9. In a skid or truck, the combination of a frame, wheels connected to said frame and supporting the same, anti-friction rollers mounted on the top side of said frame forming a supporting means for a barrel or cask, side members forming handles to said frame and extending at an angle downwardly to form an incline up which a barrel or cask may be rolled into position, and means adjacent to the first pair of said anti-friction rollers forming an incline reaching approximately to the top of said rollers.

10. The combination with a truck provided with rollers for supporting a barrel or cask and permitting easy rotation thereof on its axis, of a funnel for receiving the contents of the barrel from its bung hole, and a chute extending upwardly from the funnel to catch the flow from the bunghole while the barrel is being rotated.

11. The combination with a truck provided with carrying rollers, barrel-supporting rollers and an incline from the floor to said last named rollers, of a funnel, and a chute extending upwardly from said funnel.

12. The combination with a hand-truck frame comprising an incline from one end thereof to a position near the other end, of rollers connected to the frame in said position to support a barrel or cask and permit easy rotation thereof on its axis, additional rollers connected to the other end of the frame, a funnel, a screen in said funnel, and a chute extending upwardly from the funnel.

In testimony whereof I have signed my name to this specification, in the presence of two subscribing witnesses, on this 23rd day of March A. D. 1907.

FRED A. KNOCHE.

Witnesses:
CHARLES F. HATMAKER,
H. J. GROSVENOR.